US011714560B2

(12) United States Patent
Pohlack (10) Patent No.: US 11,714,560 B2
(45) Date of Patent: Aug. 1, 2023

(54) SYSTEM AND METHOD FOR MANAGING MEMORY COMPRESSION SECURITY

(71) Applicant: Amazon Technologies, Inc., Seattle, WA (US)

(72) Inventor: Martin Thomas Pohlack, Dresden (DE)

(73) Assignee: Amazon Technologies, Inc., Seattle, WA (US)

(*) Notice: Subject to any disclaimer, the term of this patent is extended or adjusted under 35 U.S.C. 154(b) by 39 days.

(21) Appl. No.: 17/079,358

(22) Filed: Oct. 23, 2020

(65) Prior Publication Data

US 2021/0042044 A1 Feb. 11, 2021

Related U.S. Application Data

(63) Continuation of application No. 16/511,699, filed on Jul. 15, 2019, now Pat. No. 10,817,190.

(51) Int. Cl.
*G06F 3/06* (2006.01)
*G06F 21/57* (2013.01)

(52) U.S. Cl.
CPC .......... *G06F 3/0622* (2013.01); *G06F 3/0659* (2013.01); *G06F 3/0661* (2013.01); *G06F 3/0673* (2013.01); *G06F 21/57* (2013.01)

(58) Field of Classification Search
CPC ....... G06F 12/023–0246; G06F 3/0622; G06F 3/0659; G06F 3/0661; G06F 3/0673; G06F 21/57
USPC ................... 710/68; 382/283; 386/354–356; 704/201–230; 708/203
See application file for complete search history.

(56) References Cited

U.S. PATENT DOCUMENTS

| | | | |
|---|---|---|---|
| 5,699,539 A | 12/1997 | Garber et al. |
| 7,716,484 B1 | 5/2010 | Kaliski, Jr. |
| 9,049,011 B1 | 6/2015 | Agrawal |
| 9,229,823 B2 | 1/2016 | Resch et al. |
| 10,817,190 B1 | 10/2020 | Pohlack |

(Continued)

FOREIGN PATENT DOCUMENTS

JP 2012138851 A * 7/2012

*Primary Examiner* — Ilwoo Park
(74) *Attorney, Agent, or Firm* — Robert C. Kowert; Kowert, Hood, Munyon, Rankin & Goetzel, P.C.

(57) ABSTRACT

Systems and processes for managing memory compression security to mitigate security risks related to compressed memory page access are disclosed herein. A system for managing memory compression security includes a system memory and a memory manager. The system memory includes an uncompressed region configured to store a plurality of uncompressed memory pages and a compressed region configured to store a plurality of compressed memory pages. The memory manager identifies a memory page in the uncompressed region of the system memory as a candidate for compression and estimate a decompression time for a compressed version of the identified memory page. The memory manager determines whether the estimated decompression time is less than a constant decompression time. The memory manager, based on a determination that the estimated decompression time is less than the constant decompression time, compresses the memory page and writes the compressed memory page in the compressed region.

20 Claims, 7 Drawing Sheets

(56) References Cited

U.S. PATENT DOCUMENTS

| | | | |
|---|---|---|---|
| 2003/0208359 A1* | 11/2003 | Kang | H04N 21/44004 |
| | | | 704/278 |
| 2005/0025233 A1 | 2/2005 | Metz et al. | |
| 2006/0120462 A1* | 6/2006 | Tsuboi | H04N 19/44 |
| | | | 375/E7.278 |
| 2008/0056373 A1* | 3/2008 | Newlin | H04N 19/91 |
| | | | 375/240.23 |
| 2008/0215343 A1* | 9/2008 | Goto | G10L 19/167 |
| | | | 704/500 |
| 2012/0131320 A1 | 5/2012 | Park et al. | |
| 2012/0166840 A1 | 6/2012 | Rothman et al. | |
| 2013/0262867 A1 | 10/2013 | Evancich et al. | |
| 2014/0205005 A1* | 7/2014 | Winger | H04N 19/40 |
| | | | 375/240.03 |
| 2018/0089000 A1* | 3/2018 | Ryu | G06F 9/5066 |
| 2019/0045031 A1 | 2/2019 | Feghali et al. | |
| 2019/0147067 A1 | 5/2019 | Rigor | |

* cited by examiner

SYSTEM AND METHOD FOR MANAGING MEMORY COMPRESSION SECURITY

This application is a continuation of U.S. patent application Ser. No. 16/511,699, filed on Jul. 15, 2019, which is hereby incorporated by reference herein in its entirety.

BACKGROUND

Memory usage drives operational costs in an information technology infrastructure, such as cloud computing or distributed computing environments. Virtualized computing systems may perform services that have higher memory requirements but not necessarily have higher memory usage at a particular point in time. In order to increase memory density available for the virtualized computing systems, memory for a given virtual machine may be assigned in excess of actual memory present at a physical host of the given virtual machine in a process known as memory oversubscription. Another method to increase memory density is to compress memory pages that have been unused for a certain period of time and moved to another location, such as hard storage or swap space. A client may request the memory page to be retrieved from the other location in order to perform additional tasks with the memory page. In response to the request, the memory page is retrieved and decompressed and delivered to the client.

Malicious actors can manipulate data stored in the memory page in an attempt to decipher or deduce information pertaining to the server, such as a secret key. Similarity in compression sizes between the manipulated data and an unmodified memory page can indicate how close the malicious actor is to guessing the secret key. The malicious actors determine how similar decompression times are between the manipulated data and the unmodified memory page to determine how similar the manipulated data is to the secret key in the unmodified memory page. Generally, lower differences in the decompression times tend to indicate that the compressed sizes are more similar, so the malicious actor can determine that the manipulated data is closer to the secret key. In order to prevent the malicious actors from calculating the differences in the decompression times, all decompressions of memory pages are configured to be completed at a fixed duration of time. The fixed duration of time is typically set at worst-case decompression time in order to make all memory pages decompressed at the highest possible time.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. As used throughout this application, the phrase "based on" a factor means based at least in part on the factor, rather than exclusively based on the factor, such that an event "based on" the factor can also be influenced or modified by another factor.

DETAILED DESCRIPTION

Various embodiments of systems and processes for managing memory compression security are disclosed herein. In one aspect of the invention, a system is disclosed. The system includes a system memory and a memory manager. The system memory includes an uncompressed region configured to store a plurality of uncompressed memory pages. The system memory also includes a compressed region configured to store a plurality of compressed memory pages. The memory manager is configured to identify a memory page in the uncompressed region of the system memory as a candidate for compression. The memory manager is also configured to estimate a decompression time for a compressed version of the identified memory page. The memory manager further is configured to determine whether the estimated decompression time is less than a constant decompression time, wherein when decompressing memory pages, the memory manager is further configured to wait for the constant decompression time to elapse before returning the decompressed memory pages even if the memory pages are decompressed faster than the constant decompression time. The memory manager is also configured to, based at least in part on a determination that the estimated decompression time is less than the constant decompression time, compress the memory page. The memory manager is yet also configured to write the compressed memory page in the compressed region of the system memory.

In another aspect of the invention, a method is disclosed. The method includes identifying a memory page in an uncompressed region of system memory as a candidate for compression. The method also includes estimating a decompression time for a compressed version of the memory page. The method further includes determining whether the estimated decompression time is less than a constant decompression time, wherein a decompression operation of memory pages is configured to wait for the constant decompression time to elapse before returning the decompressed memory pages even if the memory pages are decompressed faster than the constant decompression time. The method also includes, based at least in part on a determination that the estimated decompression time is less than the constant decompression time, compressing the memory page. The method yet further includes writing the compressed memory page in a compressed region of the system memory.

In yet another aspect of the invention, one or more non-transitory, computer-readable storage media are disclosed. The one or more non-transitory, computer-readable storage media store instructions that, when executed on or across one or more processors, cause the one or more processors to identify a memory page in an uncompressed region of system memory as a candidate for compression. The one or more non-transitory, computer-readable storage media also store instructions that cause the one or more processors to estimate a decompression time for a compressed version of the identified memory page. The one or more non-transitory, computer-readable storage media further store instructions that cause the one or more processors to determine whether the estimated decompression time is less than a constant decompression time, wherein a decompression operation of memory pages is configured to wait for the constant decompression time to elapse before returning the decompressed memory pages even if the memory pages are decompressed faster than the constant decompression time. The one or more non-transitory, computer-readable storage media yet also store instructions that cause the one or more processors to, based at least in part on a determination that the estimated decompression time is less than the constant decompression time, compress the memory page. The one or more non-transitory, computer-readable storage media further store instructions that cause the one or more processors to write the compressed memory page in a compressed region of the system memory.

Figure 1:
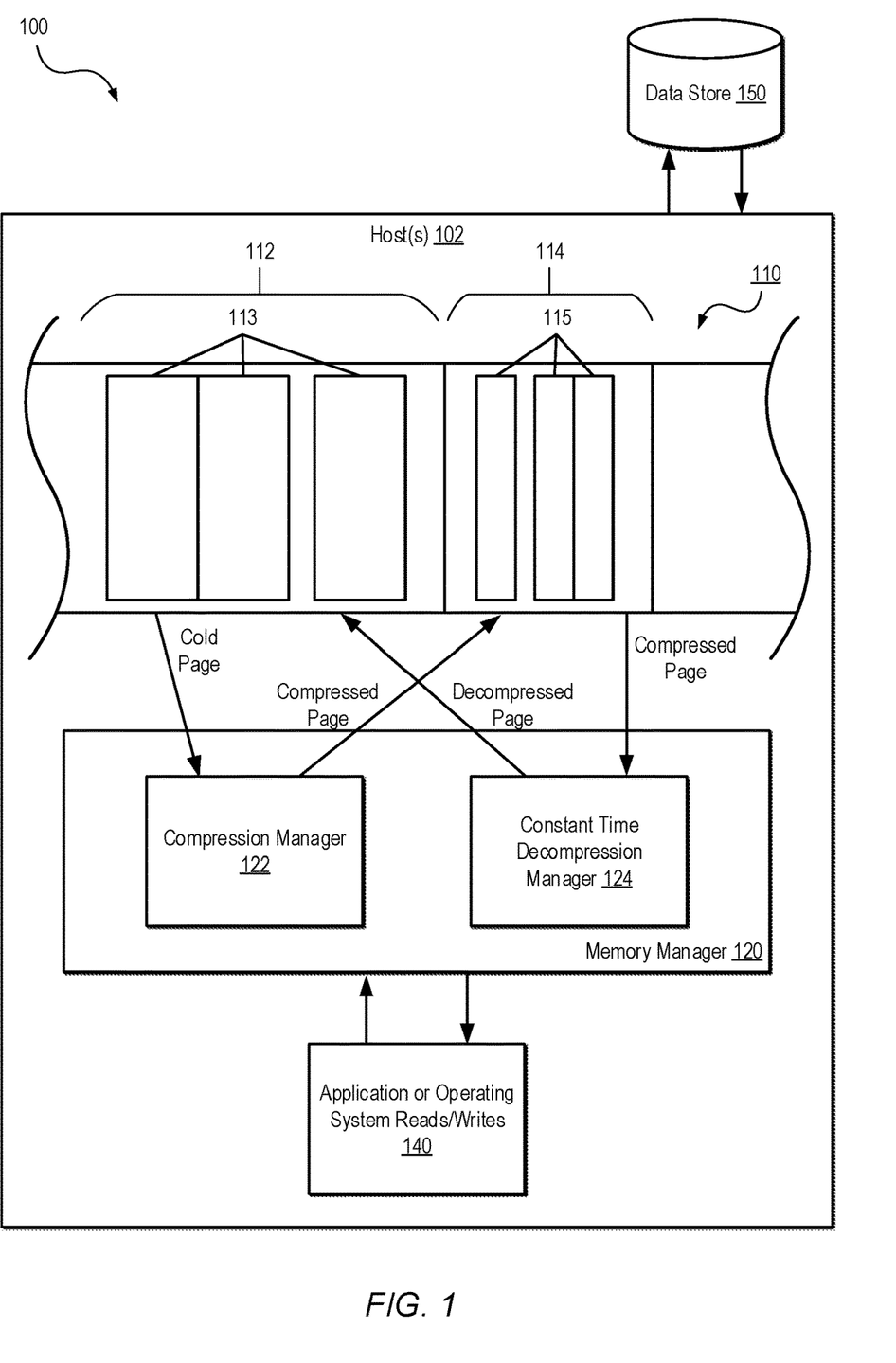
FIG. 1 illustrates a block diagram of a memory management system configured to securely manage memory compression, according to some embodiments.

FIG. 1 illustrates a block diagram of a memory management system 100 configured to securely manage memory compression, according to some embodiments. The memory management system 100 may include one or more hosts 102 configured to perform one or more services. In some embodiments, the one or more services may be provided as part of a provider network configured to provide distributed computing resources. In some embodiments, the one or more hosts 102 may be hardware computing systems configured to provide virtualized computing resources, including but not limited to virtualized compute instances, virtual machines, etc.

The one or more hosts 102 may include system memory 110, according to some embodiments. The system memory 110 is depicted in a linear arrangement for illustrative purposes but can be of any suitable logical or physical structure for use by the one or more hosts 102. The system memory may include an uncompressed region 112 configured to store memory pages 113 and a compressed region 114 configured to store compressed memory pages 115. In some embodiments, the uncompressed region 112 may be contiguous to maintain data integrity between the memory pages 113. In some embodiments, the compressed region 114 may be contiguous to maintain data integrity between the compressed memory pages 115. In other embodiments, the uncompressed region 112 and the compressed region 114 may be separated such that the system memory 110 includes a plurality of uncompressed regions 112 and a plurality of compressed regions 114. The memory pages 113 may be stored in the uncompressed region 112 in a contiguous or fragmented manner, according to some embodiments. The compressed memory pages 115 may be stored in the compressed region 114 in a contiguous or fragmented manner, according to some embodiments.

The one or more hosts 102 may include a memory manager 120 configured to manage the system memory 110, according to some embodiments. In some embodiments, the memory manager 120 may include one or more components or modules configured to manage the memory pages 113 and the compressed memory pages 115 on the system memory 110. For example, the memory manger 120 may include a compression manager 122 and a constant time decompression manager 124, which may be referred to as a decompression manager 124. In some embodiments, the compression manager 122 may be configured to compress data to or from the system memory 110. For example, the compression manager 122 may be configured to compress the memory pages 113 from the uncompressed region 112 and store the compressed memory pages 115 to the compressed region 114. As another example, the compression manager 122 may be configured to receive data from an application or an operating system executing on the one or more hosts 102. For example, an application or operating system read/write operation 140 may cause data to be stored or retrieved from the system memory 110 by interacting with the memory manager 120. In some embodiments, the application or operating system read/write operation 140 may be insulated or sandboxed from directly accessing the system memory 110. For example, the application or operating system read/write operation 140 may execute commands that request or instruct the memory manager 120 to read from or write to the system memory 110.

The memory manager 120 may identify a given memory page 113 in the uncompressed region 112 of the system memory 110 as a candidate for compression, according to some embodiments. The memory manager 120 may determine that the uncompressed region 112 has at least one of the memory pages 113 that has been unused for a certain period of time, according to some embodiments. For example, the memory manager 120 may determine that a given memory page 113 has not been used by the one or more hosts 102 or by the application or operating system read/write operation 140 within a time period threshold. A memory page that has been unused for a certain period of time may also be referred to as a cold memory page or a cold page. In some embodiments, after determining that at least one of the memory pages 113 is a cold page, the compression manager 122 may compress the cold page as a compressed memory page. The compression manager 122 may send the compressed memory page to the compressed region 114 to be stored as one of the compressed memory pages 115. In some embodiments, the memory manager 120 may be configured to send the compressed memory page to the compressed region 114 to be stored as one of the compressed memory pages 115 on behalf of the compression manager 122.

In some embodiments, the memory pages may include data and security data. A malicious actor may construct a fabricated memory page from data that would be included in a legitimate memory page. The fabricated memory page may also include fabricated security data that is attempting to be close to legitimate security data in order to gain unauthorized access to other components of the memory management system 100, such as financial record data storage, customer information data storage, or other secured areas of the provider network. When the fabricated memory page is inserted into the memory management system 100, such as via the application or operating system read/write operation 140, the fabricated memory page may be compressed and stored to the compressed region 114 of the system memory 110, similar to the legitimate memory page being handled by the memory manager 120. At a later time, the compressed fabricated memory page is retrieved from the compressed region 114 for decompression by the memory manager 120, such as by the decompression manager 124 in some embodiments. The malicious actor may compare a decompression time for the fabricated memory page against a decompression time for the legitimate memory page in order to determine how accurate the fabricated security data is to the legitimate security data. When the fabricated security data is more similar to the legitimate security data, the decompression times are closer in value.

In order to counteract this type of security attack, the memory manager 120 may be configured to obfuscate decompression times by extending the decompression time in such a way that each decompression takes a constant period of time. In some embodiments, the decompression manager 124 may extend a decompression time for a plurality of compressed memory pages 115 to a constant decompression time. For example, the decompression manager 124 may complete a decompression of a given compressed memory page 115 and wait until the constant decompression time has elapsed. In some embodiments, the decompression manager 124 may initiate a timer prior to or concurrent with the decompression of the given compressed memory page 115. The timer may indicate to the decompression manager 124 that the constant decompression time has elapsed.

In some embodiments, the delay may include instructing the decompression manager 124 to wait or remain idle. For example, a wait command may be configured to be executed at the end of decompression for a duration of time based on a difference between an actual decompression time and the constant decompression time. In some embodiments, the wait command may be included as part of the decompression function. In other embodiments, the wait command may be executed by the memory manager 120 in anticipation of completion of the decompression. In some embodiments, during the delay, the decompression manager 124 may perform other operations. For example, the decompression manager 124 may perform other decompression tasks instead of only remaining idle or waiting during the delay. As another example, the memory manager 120 may perform additional compressions with the compression manager 122 during the delay. As yet another example, the memory manager 120 may repurpose at least one portion of the decompression manager 124 to perform compression functions in a manner consistent with the compression manager 122. Thus, the decompression manager 124 may be in continuous use despite being instructed to delay a given decompression.

The constant decompression time may be selected or set such that every compressed memory page 115 may be decompressed at a time that is less than or equal to the constant decompression time, according to some embodiments. For example, the constant decompression time may be selected to be a worst-case decompression time corresponding to a decompression time for a compressed memory page 115 that takes the longest amount of time for the decompression manager 124 to decompress. In some embodiments, measurement of the worst-case decompression time may be performed by the decompression manager 124, the memory manager 120, or any suitable component or module. The worst-case decompression time may be used as the constant decompression time for each decompression of the compressed memory pages 115. In some embodiments, a decompression function or operation executed by the decompression manager 124 may delay completion of decompression of each compressed memory page 115 until the constant decompression time elapses. For example, supposing a fixed decompression time of 100 ms, the decompression function may delay completion of decompression for the compressed memory pages 115 under 100 ms of time, such as 50 ms or 25 ms, until 100 ms has elapsed. Then, the decompression function may return the decompressed memory page to the uncompressed region 112 of the system memory 110.

The constant decompression time being automatically set to the worst-case decompression time may result in computational inefficiencies. For example, supposing that an average decompression time is 20 ms and a worst-case decompression time is 100 ms, a delay for an average decompression would be approximately 80 ms. The worst-case decompression time may also be a statistical outlier relative to a majority of other decompression times. For example, the worst-case decompression time may be significantly outside a standard deviation of a distribution of the decompression times. Significantly delaying more frequent decompression times may cause the decompression manager 124 to perform artificially slower for the benefit of a smaller quantity of memory pages that have higher decompression times. Overall computational efficiency for the decompression manager 124 may be improved by reducing the constant decompression time and limiting which of the memory pages 113 get compressed by the compression manager 122, according to some embodiments.

The memory manager 120 may be configured to estimate decompression times for the memory pages 113, according to some embodiments. For example, the memory manager 120 may calculate the decompression times through any number of suitable methods. In some embodiments, the decompression times may be calculated by actually compressing the memory page 113 and decompressing the compressed memory page 115 while running a timer to track the decompression time. In other embodiments, a predictive model may be generated by the memory manager 120 based on one or more of a compression algorithm of the compression manager 122 or a decompression algorithm of the decompression manager 124. For example, the memory manager 120 may apply the predictive model to a given memory page 113 to algorithmically predict a compressed size of the given memory page 113 and a decompression time for decompressing a compressed version of the given memory page 113. The compressed size in comparison with an uncompressed size of the given memory page 113 may indicate the complexity of the compression such that the decompression time may be deduced or calculated from the compressed size. In some embodiments, the predictive model is configured to calculate the compressed size and the decompression time without necessarily compressing or decompressing the given memory page 113. In other embodiments, the decompression times may be calculated based on a function configured to determine a measure of entropy of compression of a given memory page 113. For example, the measure of entropy may indicate that the compression of the given memory page 113 is complex and may have a longer decompression time. Alternatively, the measure of entropy may indicate that the compression algorithm causes the compressed version of the given memory page 113 to be larger in size than the given memory page 113 itself.

The memory manager 120 may be configured to determine statistics about a distribution of decompression times for the compressed memory pages 115, according to some embodiments. For example, the memory manager 120 may be configured to maintain a count of a quantity of memory pages having respective decompression times. In some embodiments, the statistics may be visualized with a graph or a plot that correlates a quantity of memory pages with their corresponding decompression times. For example, the statistics may be visualized with a line graph described in more detail in FIG. 2. In some embodiments, the memory manager 120 may determine a statistical reference point for selecting the constant decompression time. For example, the memory manager 120 may determine an average decompression time for the decompression times as the statistical reference point. As another example, the memory manager 120 may determine a median decompression time for the decompression times as the statistical reference point. In other embodiments, the memory manager 120 may determine a standard deviation of the decompression times as a basis for selecting the constant decompression time. For example, the memory manager 120 may determine a range of decompression times that represent a majority of the memory pages such that a minority of memory pages are represented outside of the range. The memory manager 120 may use any combination of the statistical reference points to select the constant decompression time, according to some embodiments.

Based on the statistics, the memory manager 120 may reduce the constant decompression time in order to reduce overhead on decompressions performed by the decompression manager 124, according to some embodiments. Overall wait times after decompression can be reduced for each decompression that would otherwise be completed prior to the constant decompression time elapsing. In some embodiments, the constant decompression time may be determined based on a statistical reference point. For example, the memory manager 120 may determine the constant decompression time based on an average decompression time. As another example, the memory manager 120 may determine the constant decompression time based on a median decompression time. In some embodiments, the constant decompression time may be determined based on a standard deviation from the statistical reference point such that most of the decompression times are under the constant decompression time while few of the decompression times are between the constant decompression time and the worst-case decompression time. For example, the memory manager 120 may determine the standard deviation of the distribution based around the average decompression time. As another example, the memory manager 120 may determine the standard deviation of the distribution based around the median decompression time. In other embodiments, the constant decompression time may be determined based on the worst-case decompression time. For example, the memory manager 120 may work backwards from the worst-case decompression time to determine how far the constant decompression time can be reduced while limiting the number of memory pages that would no longer be decompressed in a time that is less than the constant decompression time. In some embodiments, the memory manager 120 may determine the constant decompression time based on determining that a particular relative quantity of the memory pages with higher decompression times would be in between the constant decompression time and the worst-case decompression time. For example, the memory manager 120 may select the constant decompression time to exclude 1% of the highest decompression times for the memory pages. The constant decompression time may also be selected based on hardware specifications of the one or more hosts 102, according to some embodiments. In some embodiments, processing times and total size of the system memory 110 may be used as factors in selecting the constant decompression time. For example, in hardware environments with less available processing times and higher sizes of the system memory 110, the constant decompression time may be reduced. As another example, in hardware environments with more available processing times and lower sizes of the system memory 110, the constant decompression time may be increased.

The constant decompression time used by the decompression manager 124 may be recalculated for subsequent decompressions in order to improve decompression efficiency in view of additional memory pages being processed since the constant decompression time had been previously selected. In some embodiments, the constant decompression time may be recalculated on a continuous basis. For example, the worst-case decompression time may be determined to be higher when a subsequent memory page has a higher decompression time than the worst-case decompression time. The higher decompression time may be used as an updated constant decompression time such that subsequent decompressions of memory pages may be delayed until the updated fixed decompression time has elapsed. In other embodiments, the average decompression time may gradually shift in response to additional memory pages having higher or lower decompression times relative to the average decompression time. For example, a significant number of lower decompression times may cause a new average decompression time to be recalculated as lower than the average decompression time that was previously calculated. In other embodiments, the median decompression time may gradually shift in response to additional memory pages having higher or lower decompression times relative to the median decompression time. For example, a significant number of higher decompression times may cause a new median decompression time to be recalculated as higher than the median decompression time that was previously calculated. In other embodiments, the constant decompression time may be periodically or regularly updated. For example, decompression times for a set of memory pages that are compressed and decompressed in a time period or time window may be tabulated and used to determine an average decompression time or a median decompression time that may be used as the worst-case decompression time.

In some embodiments, the compression manager 122 may be configured to refrain from compressing a given memory page 113 should the memory manager 120 determine that the decompression time for the given memory page 113 satisfies a decompression time threshold. For example, the compression manager 122 may determine to not compress the given memory page 113 based on a determination that the decompression time for the given memory page 113 exceeds the constant decompression time. In other embodiments, the compression manager 122 may be configured to refrain from compressing a given memory page 113 based on a determination that compression would result in minor levels of compression or increased sizes of the given memory page 113 as a result of the compression. For example, the compression manager 122 may determine to not compress the given memory page 113 based on a compression ratio being so small that the cost of decompression would outweigh the benefit of compression. Generally, data that includes photo, audio or video data tends to benefit less from compression relative to text data. As another example, the compression manager 122 may determine to not compress the given memory page based on a compressed size of the compressed version of the given memory page 113 being greater than or equal to the actual size of the given memory page 113. The compression ratio may be checked against a compression ratio threshold that indicates a minimum compression ratio required to allow the compression manager 122 to compress the given memory page 113.

Based on a determination to refrain from compressing the given memory page 113, the memory manager 120 may identify another memory page 113 in the uncompressed region 112 of the system memory as another candidate for compression, according to some embodiments. For example, the memory manager 120 may identify that the other memory page 113 is similarly unused for a period of time and is a cold page that should be compressed and written to the compressed region 114 of the system memory 110. In some embodiments, identifying a valid candidate for compression may require any number of iterations in order to identify a suitable candidate that satisfies the compression ratio threshold and has a decompression time that is less than the constant decompression time.

Based on a determination that the decompression time for the given memory page 113 satisfies the decompression time threshold, the memory manager 120 may cause the given memory page 113 to be compressed, according to some embodiments. For example, the memory manager 120 may cause the compression manager 122 to receive the given memory page 113 from the uncompressed region 112. The compression manager 112 may use a compression algorithm to compress the given memory page 113 to generate a compressed memory page 115. In some embodiments, the compressed memory page 115 may be stored or written to the compressed region 114 of the system memory 110. In other embodiments, the compressed memory page 115 may be stored at another storage destination. For example, the memory manager 120 may direct the compressed memory page 115 to be stored at data store 150. The data store 150 may include a persistent storage device that is non-volatile. In some embodiments, the data store 150 may be a component of the one or more hosts 102. In other embodiments, the data store 150 may be centralized in a portion of the provider network that is accessible but not directly a part of the one or more hosts 102. In some embodiments, the data store 150 may be configured to operate as swap space for the memory manager 120 to offload one or more memory pages to reduce dependency on the system memory 110 in cases of memory overuse. In some embodiments, the memory manager 120 may determine whether to compress the given memory page 113 for storage at the data store 150 separately from the determination of whether to compress the given memory page 113 for the compressed region 114 of the system memory 110. For example, the memory manager 120 may have a second constant decompression time that serves as a second decompression time threshold for memory pages stored at the data store 150. The second constant decompression time may obfuscate or conceal actual decompression times for memory pages stored at the data store 150, according to some embodiments. After the compressed memory page 115 has been moved to a subsequent destination, the memory manager 120 may free up memory space in the uncompressed region 112 of the system memory 110, according to some embodiments. For example, the memory manager 120 may cause the memory page 113 that exists in the uncompressed region 112 to be reallocated for use by other processes or data.

At a later time, the application or operating system read/write operation 140 may provide a request for a compressed memory page 115 in the compressed region 114 of the system memory 110, according to some embodiments. For example, the application or operating system read/write operation 140 may request data from the compressed memory page 115 requiring that the compressed memory page 115 be decompressed and moved to the uncompressed region 112 of the system memory 110. In some embodiments, the memory manager 120 may retrieve the compressed memory page 115 from the compressed region 114 and provide the compressed memory page 115 to the decompression manager 124. In some embodiments, the decompression manager 124 may initiate a decompression timer prior to or concurrent with initiating a decompression function to decompress the compressed memory page 115. The decompression timer may be used to determine a decompression time relative to the constant decompression time. The decompression manager 124 may decompress the compressed memory page 115 in accordance with the decompression function. In some embodiments, the decompression function may complete the decompression of the compressed memory page 113 at a decompression time prior to the constant decompression time. For example, the decompression timer may indicate that the decompression time for the compressed memory page 115 is less than the constant decompression time. For illustrative purposes, supposing a constant decompression time of 100 ms, the decompression timer may indicate that the decompression time is measured to be 60 ms. In some embodiments, the decompression manager 124 may be instructed to wait until the decompression timer indicates that the constant decompression time has elapsed, even if the compressed memory pages 115 are decompressed faster than the constant decompression time. For example, the decompression manager 124 may wait for an additional 40 ms after completion of the decompression in order to obfuscate that the decompression time is 60 ms. After waiting for the constant decompression time to be elapsed, the memory manager 120 may fulfill the request and write the decompressed memory page 113 to the uncompressed region 112 of the system memory 110, according to some embodiments.

Figure 2:
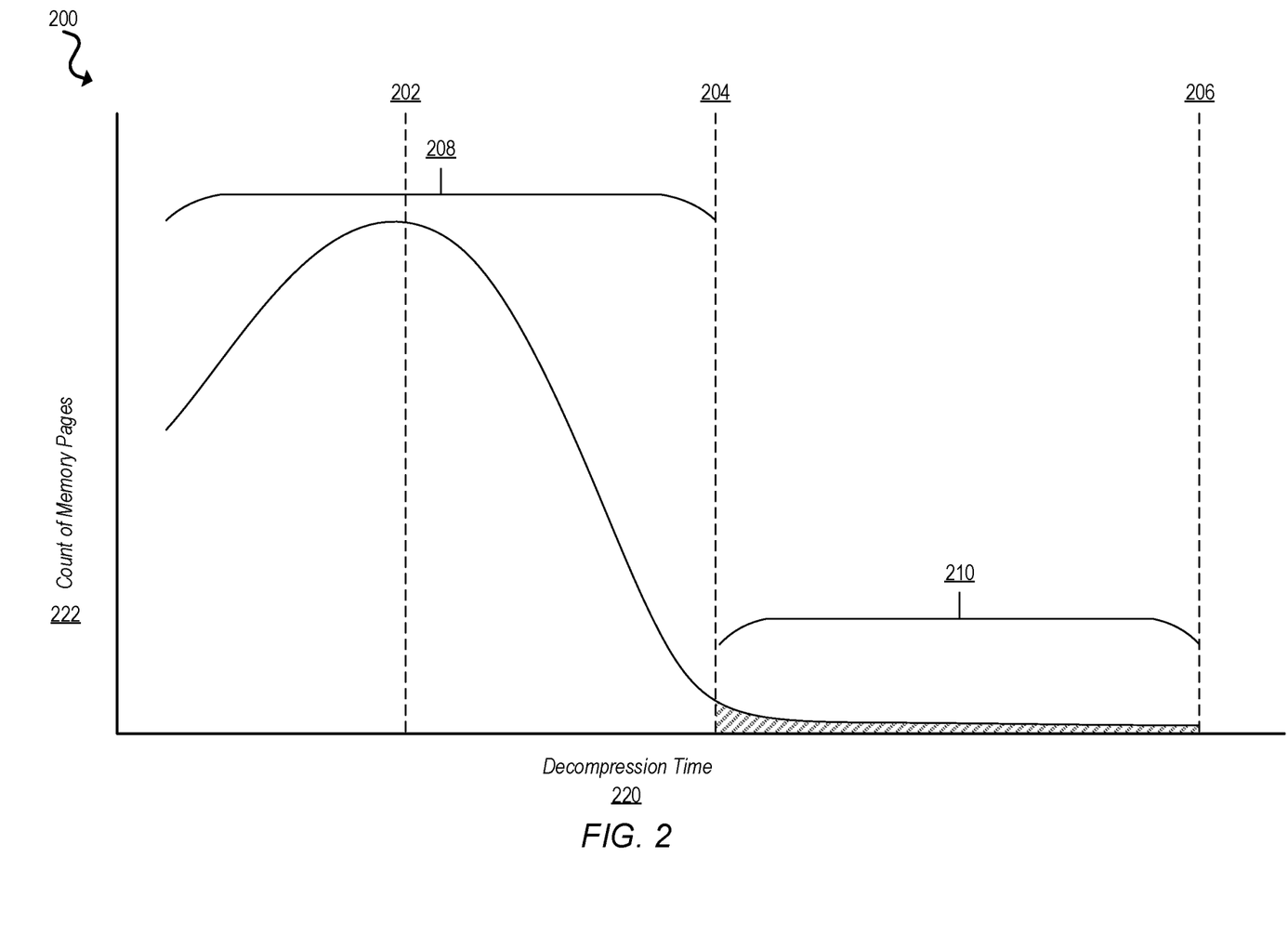
FIG. 2 illustrates a graph diagram comparing decompression times against counts of memory pages, according to some embodiments.

FIG. 2 illustrates a graph 200 that represents an example of a count of memory pages 222 having various decompression times 220 as processed by a memory manager, according to some embodiments. The graph 200 may be a representation of a distribution of a count of memory pages 222 on a y-axis relative to their respective decompression times on an x-axis representing a decompression time scale 220 as processed by the memory manager. In some embodiments, the memory manager may correspond to the memory manager 120 of FIG. 1. The memory pages may correspond to one or more of the memory pages 113 and the compressed memory pages 115 of FIG. 1. The decompression time 220 may be measured by the memory manager 120 based on at least one of the methods described herein.

As an illustrative example, a reference decompression time 202 may be a statistically relevant reference point in time. In some embodiments, the reference compression time 202 may be an average decompression time for the memory pages. In other embodiments, the reference compression time 202 may be a median decompression time for the memory pages. In other embodiments, the reference compression time 202 may be a center point decompression time for a standard deviation of the memory pages.

A worst-case decompression time 206 may be determined based on a highest decompression time along the decompression time scale 220. In some embodiments, the worst-case decompression time 206 may be used as a highest possible value for decompression times by a decompression manager, such as the decompression manager 124 of FIG. 1.

A constant decompression time 204 may be determined from one or both of the reference decompression time 202 and the worst-case decompression time 206. For example, the constant decompression time 204 may be initially set to be the worst-case decompression time 206. After timing multiple decompressions of the memory pages, the constant decompression time 204 may be shifted to be closer to the reference decompression time 202 in order to improve efficiency of the memory manager with respect to decompression of memory pages. The constant decompression time 204 may be utilized by the memory manager as a threshold value in determining whether a given memory page should be compressed and written to a compressed region of system memory.

Memory pages that have decompression times that are less than the constant decompression time 204 may be eligible for compression by the memory manager, according to some embodiments. For example, the graph 200 illustrates eligible memory pages as part of compressable range 208. Memory pages that have decompression times that are greater than the constant decompression time 204 may be ineligible for compression by the memory manager, according to some embodiments. For example, the graph 200 illustrates eligible memory pages as part of uncompressable range 210.

Figure 3:
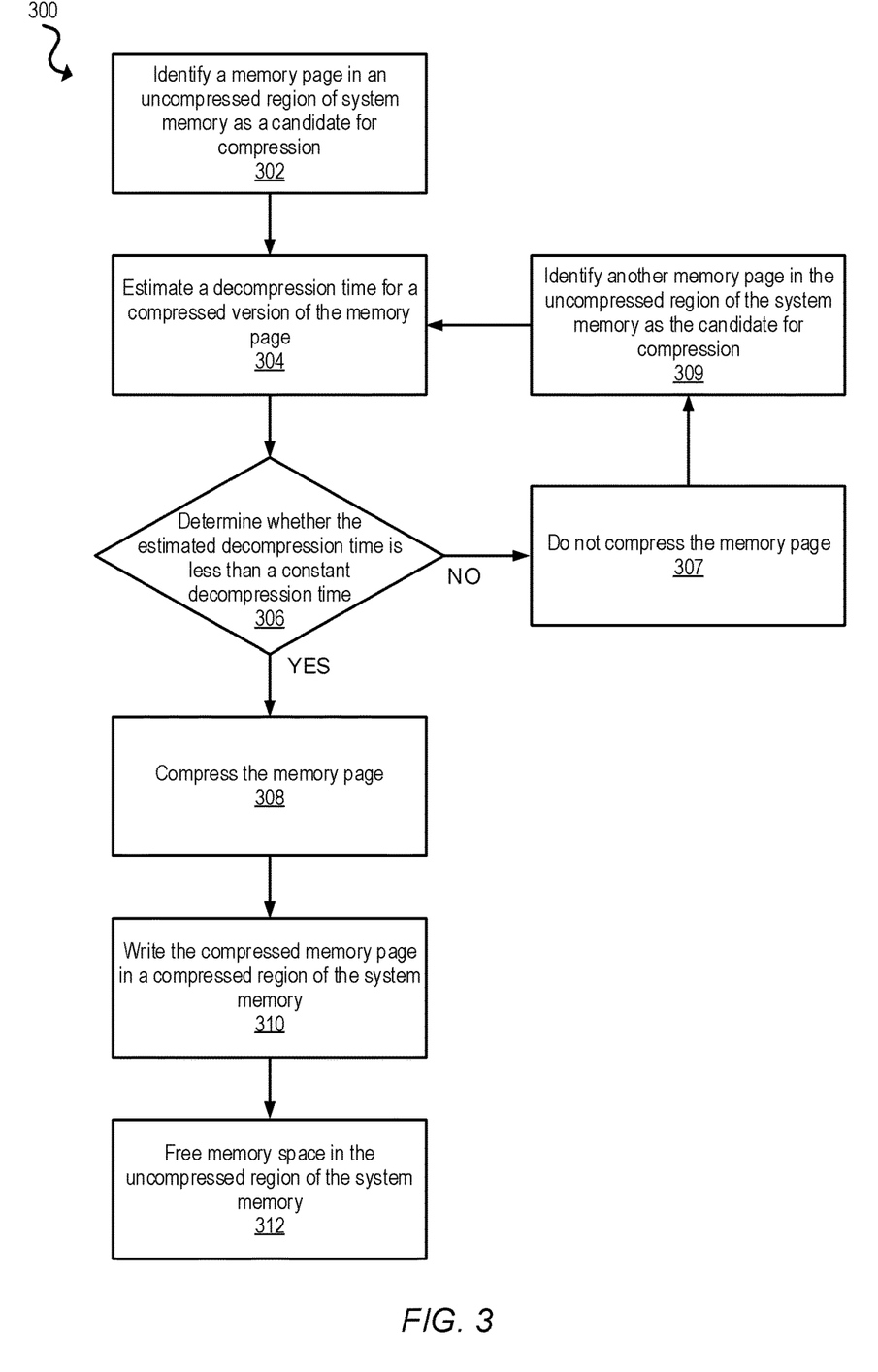
FIG. 3 illustrates a flowchart diagram for compressing memory pages in system memory, according to some embodiments.

FIG. 3 illustrates a flowchart diagram of a method 300 for compressing a memory page by a compression manager of a memory manager, according to some embodiments. The method 300 may be performed by a memory manager, according to some embodiments. The memory page may correspond to a given memory page of the memory pages 113 of FIG. 1. The compression manager may correspond to the compression manager 122 of FIG. 1. The memory manager may correspond to the memory manager 120 of FIG. 1.

The method 300 includes identifying a memory page in an uncompressed region of system memory as a candidate for compression, at 302. The memory page may correspond to a given memory page of the memory pages 113 of FIG. 1. The uncompressed region may correspond to the uncompressed region 112 of FIG. 1. The system memory may correspond to the system memory 110 of FIG. 1. In some embodiments, the memory page may be identified as the candidate for compression based on a last used time of the memory page. The memory page may be indicated as a cold page based on the last used time. For example, the memory page may be identified as the candidate for compression based on the last used time indicating that the memory page has the oldest last used time relative to other memory pages in the uncompressed region.

The method 300 includes estimating a decompression time for a compressed version of the memory page, at 304. In some embodiments, estimating the decompression time may include measuring the decompression time for decompressing the memory page at runtime. For example, estimating the decompression time may include compressing the memory page and decompressing the compressed memory page while running a timer to track the decompression time. In other embodiments, a predictive model may be generated by the memory manager based on one or more of a compression algorithm of the compression manager or a decompression algorithm of the decompression manager. For example, the memory manager may apply the predictive model to the memory page to algorithmically predict a compressed size of the memory page and a decompression time for decompressing a compressed version of the memory page. The compressed size in comparison with an uncompressed size of the memory page may indicate the complexity of the compression such that the decompression time may be deduced or calculated from the compressed size. In some embodiments, the predictive model is configured to calculate the compressed size and the decompression time without necessarily compressing or decompressing the memory page. In other embodiments, estimating the decompression time may include utilizing a function configured to determine a measure of entropy of compression of the memory page. For example, the measure of entropy may indicate that the compression of the memory page is complex and may have a longer decompression time. Alternatively, the measure of entropy may indicate that the compression algorithm causes the compressed version of the memory page to be larger in size than the memory page itself.

The method 300 also includes determining whether the estimated decompression time is less than a constant decompression time, at 306. The constant decompression time may correspond to the constant decompression time 204 of FIG. 2. The memory manager may perform a simple comparison between the estimated decompression time and the constant decompression time. Based on whether the estimated decompression time is greater than or less than the constant decompression time, the memory manager may determine whether to compress the memory page.

Based on a determination that the estimated decompression time is not less than the constant decompression time, the method 300 includes the memory manager not compressing the memory page, at 307. The method 300 may also include identifying another memory page in the uncompressed region of the system memory as the candidate for compression, at 309. The memory manager may attempt to identify the other memory page based on a last used time for the other memory page to determine whether the other memory page is another cold page. After identifying the other memory page as the candidate for compression, the method 300 returns to 304.

Based on a determination that the estimated decompression time is less than the constant decompression time, the method 300 includes compressing the memory page, at 308. In some embodiments, the memory manager may include a compression manager configured to compress memory pages. The compression manager may correspond to the compression manager 122 of FIG. 1. The compression manager may compress the memory page according to a compression algorithm to generate a compressed memory page, in some embodiments.

The method 300 further includes writing the compressed memory page in a compressed region of the system memory, at 310. The compressed region may correspond to the compressed region 114 of FIG. 1. In some embodiments, the memory manager may transfer the compressed memory page to the compressed region of the system memory. In other embodiments, the memory manager may instruct the compression manager to send the compressed memory page to the compressed region of the system memory. In some embodiments, the compressed memory page may be sent to an alternative storage destination. For example, the memory manager may send the compressed memory page to a persistent storage device, such as the data store 150 of FIG. 1. As another example, the memory manager may send the compressed memory page to swap space implemented by one or more storage devices.

The method 300 concludes by freeing memory space in the uncompressed region of the system memory, at 312. In some embodiments, the memory manager may reallocate the memory space corresponding to the memory page after confirmation that the compressed memory page was written to the compressed region of the system memory. The memory space may be used by another memory page to ensure that the memory space is not wasted by being unused.

Figure 4:
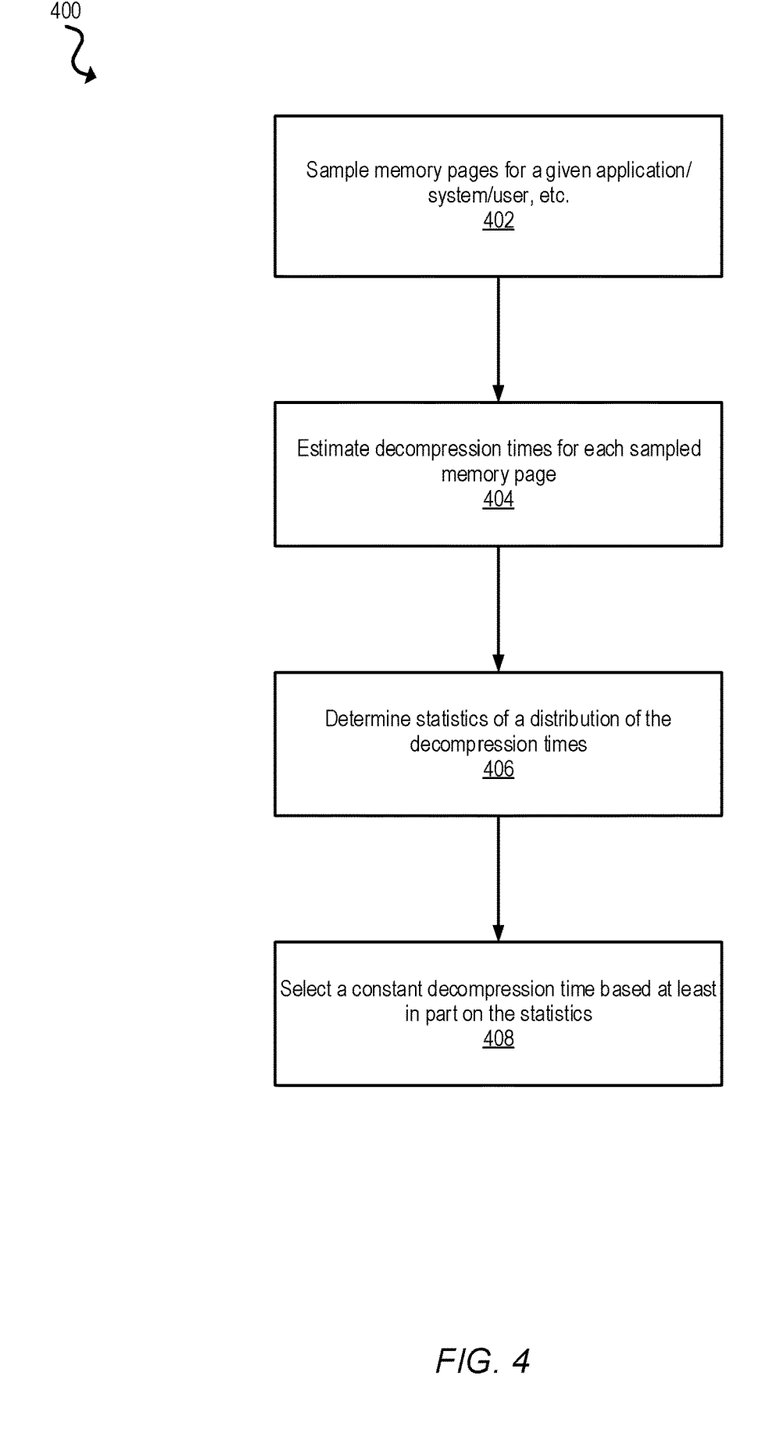
FIG. 4 illustrates a flowchart diagram for determining a constant decompression time for memory pages, according to some embodiments.

FIG. 4 illustrates a flowchart diagram for a method 400 for selecting a constant decompression time for a memory manager, according to some embodiments. The constant decompression time may correspond to the constant decompression time 204 of FIG. 2. The method 300 may be performed by a memory manager, according to some embodiments. The memory manager may correspond to the memory manager 120 of FIG. 1.

The method 400 includes sampling memory pages for a given application/system/user, etc., at 402. The memory pages may correspond to one or more of the memory pages 113 or the compressed memory pages 115 of FIG. 1. The given application/system/user may correspond to the application or operating system read/write operation 140 of FIG. 1. In some embodiments, the memory manager may examine the memory pages on system memory to sample the memory pages. In other embodiments, the memory manager may sample the memory pages in conjunction with normal processing of the memory pages by an application/system/user.

The method 400 includes estimating decompression times for each sampled memory page, at 404. In some embodiments, estimating the decompression times may include measuring the decompression times for decompressing the memory pages at runtime. For example, estimating the decompression times may include compressing the memory pages and decompressing the compressed memory pages while running a timer to track the decompression times. In other embodiments, a predictive model may be generated by the memory manager based on one or more of a compression algorithm of a compression manager or a decompression algorithm of a decompression manager. For example, the memory manager may apply the predictive model to the memory page to algorithmically predict compressed sizes of the memory pages and decompression times for decompressing compressed versions of the memory pages. The compressed sizes in comparison with uncompressed sizes of the memory pages may indicate the complexity of the compression such that the decompression times may be deduced or calculated from the compressed sizes. In some embodiments, the predictive model is configured to calculate the compressed sizes and the decompression times without necessarily compressing or decompressing the memory pages. In other embodiments, estimating the decompression times may include utilizing a function configured to determine a measure of entropy of compression of the memory page. For example, the measure of entropy may indicate that the compression of the memory page is complex and may have a longer decompression time. Alternatively, the measure of entropy may indicate that the compression algorithm causes the compressed version of the memory page to be larger in size than the memory page itself.

The method 400 also includes determining statistics of a distribution of the decompression times, at 406. The distribution of decompression times may be visualized as the graph 200 of FIG. 2. In some embodiments, the memory manager may track the decompression times with respect to a quantity of memory pages. For example, the memory manager may maintain a count of how many memory pages have a given decompression time. In some embodiments, the memory manager may determine a statistical reference point from the decompression times. The statistical reference point may correspond to the reference decompression time 202 of FIG. 2. For example, the memory manager may determine an average decompression time for the decompression times as the statistical reference point. As another example, the memory manager may determine a median decompression time for the decompression times as the statistical reference point. In other embodiments, the memory manager may determine a standard deviation of the decompression times as a basis for selecting the constant decompression time. For example, the memory manager may determine a range of decompression times that represent a majority of the memory pages such that a minority of memory pages are represented outside of the range.

The method 400 concludes by selecting a constant decompression time based at least in part on the statistics, at 408. The constant decompression time may correspond to the constant decompression time 204 of FIG. 2. In some embodiments, the memory manager may select the constant decompression time based on statistical proximity to the statistical reference point. For example, the memory manager may select the constant decompression time based on being within a tolerance range of the statistical reference point. In other embodiments, the memory manager may initially set the constant decompression time to be a worst-case decompression time and reduce the constant decompression time according to the statistics indicating that a range of decompression times represents a small quantity of memory pages with relatively high decompression times. The range of decompression times representing memory pages with relatively high decompression times may correspond to the uncompressable range 210 of FIG. 2. Memory pages that have decompression times less than the constant decompression time may be represented by a range of decompression times representing a majority of memory pages. The range of decompression times representing the majority of memory pages may correspond to the compressable range 208 of FIG. 2.

In some embodiments, the method 400 may be repeated in order to refine the constant decompression time. For example, the method 400 may be repeated on a periodic basis. In another example, the method 400 may be repeated after a threshold quantity of memory pages have been sampled.

Figure 5:
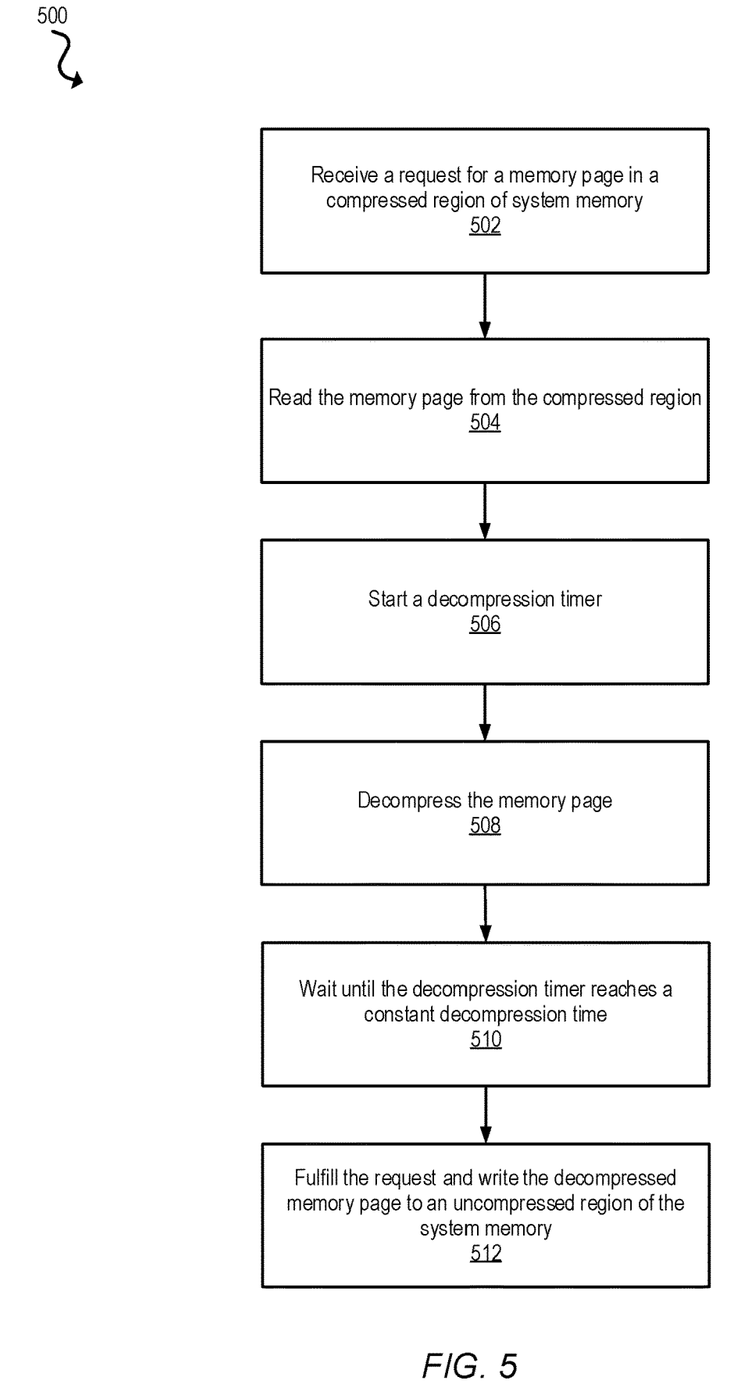
FIG. 5 illustrates a flowchart diagram for decompressing a memory page from a compressed region of system memory, according to some embodiments.

FIG. 5 illustrates a flowchart diagram of a method 500 for fulfilling a request for a memory page stored in a compressed region of system memory, according to some embodiments. The memory page may correspond to the compressed memory pages 115 of FIG. 1. The compressed region may correspond to the compressed region 114 of FIG. 1. The system memory may correspond to the system memory 110 of FIG. 1. The method 300 may be performed by a memory manager, according to some embodiments. The memory manager may correspond to the memory manager 120 of FIG. 1.

The method 500 includes receiving a request for a memory page in a compressed region of system memory, at 502. The request may be received from an application executing at one or more hosts, such as the application or operating system read/write operation 140 of FIG. 1. In other embodiments, an external client may send the request for the memory page.

The method 500 includes, in response to receiving the request, reading the memory page from the compressed region, at 504. The memory manager may be configured to access the system memory to retrieve the memory page. In other embodiments, the memory manager may send a request to the system memory to provide the memory page.

The method 500 also includes starting a decompression timer, at 506. In some embodiments, the memory manager may include one or more functions configured to operate the decompression timer. In other embodiments, the memory manager may include one or more components tasked with maintaining time for decompression operations by the memory manager. In some embodiments, the memory manager may initiate the decompression timer prior to or concurrent with decompression of the memory page.

The method 500 further includes decompressing the memory page, at 508. In some embodiments, the memory manager may include a decompression manager configured to execute one or more decompression operations to decompress memory pages. The decompression manager may correspond to the decompression manager 124 of FIG. 1. The decompression manager may perform the decompression of the memory page according to a decompression algorithm, according to some embodiments.

The method 500 includes waiting until the decompression timer reaches a constant decompression time, at 510. The constant decompression time may correspond to the constant decompression time 204 of FIG. 2. In some embodiments, the memory manager may refrain from completing the decompression operation based on the constant decompression time. For example, the memory manager may be configured to obfuscate or conceal an actual decompression time for the memory page in order to prevent information about the memory page or the decompression. In some embodiments, the decompression manager may remain waiting or idle while the decompression timer is counting up to the constant decompression time. In other embodiments, the decompression manager may be redirected to perform other operations, such as compression or decompression of other memory pages.

The method 500 concludes by fulfilling the request and write the decompressed memory page to an uncompressed region of the system memory, at 512. The uncompressed region may correspond to the uncompressed region 112 of FIG. 1. In some embodiments, fulling the request may include providing the decompressed memory page to the requesting application or operating system. In other embodiments, fulfilling the request may include providing access to the decompressed memory page at the uncompressed region. After fulfilling the request, the memory manager may free memory space corresponding to the memory page in the compressed region of the system memory.

Figure 6:
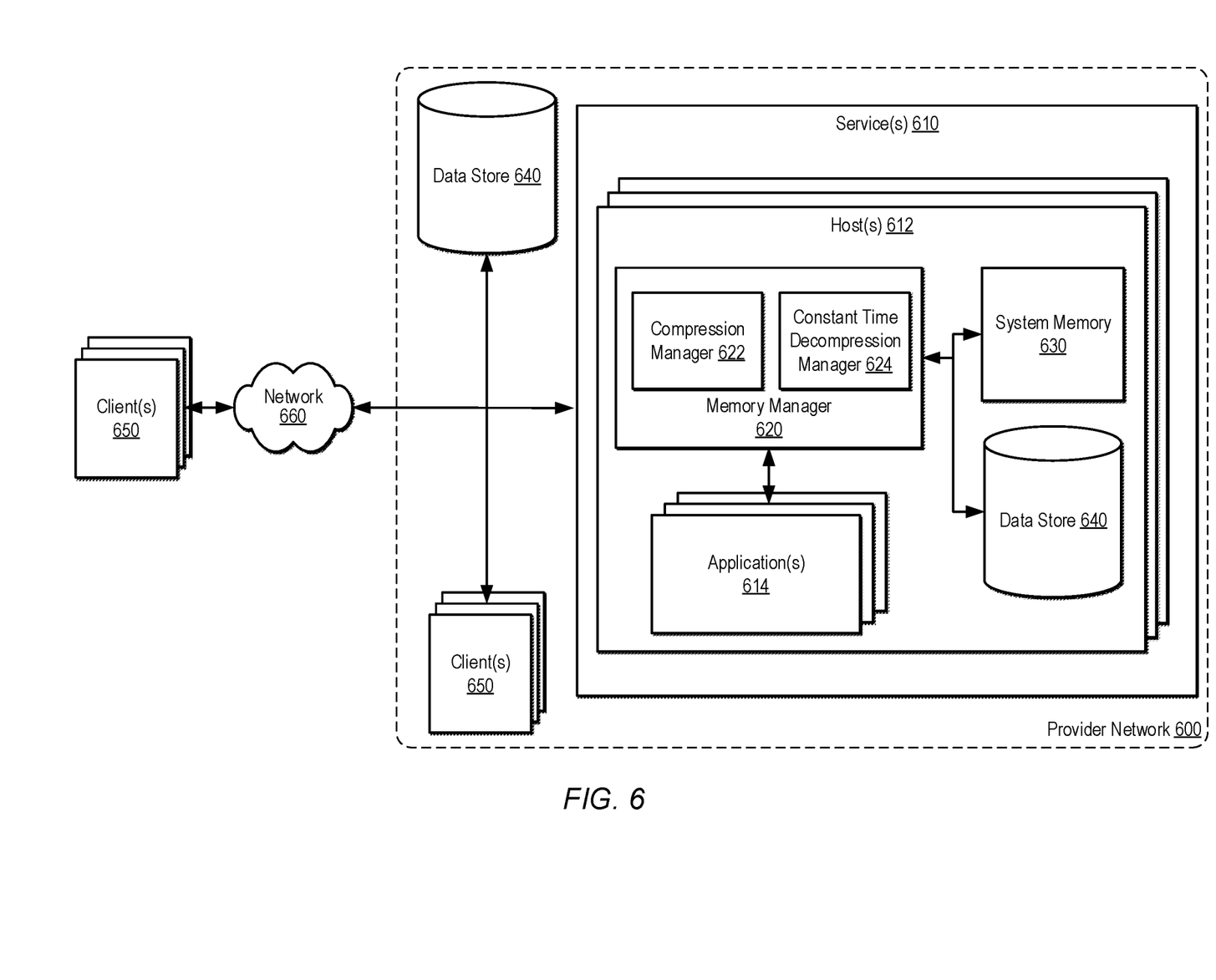
FIG. 6 illustrates a block diagram for a provider network configured to securely manage memory compression, according to some embodiments.

FIG. 6 illustrates a block diagram of a provider network 600 that is configured to provide one or more services 610 to one or more clients 650. The one or more services 610 may be fulfilled by one or more hosts 612. The one or more hosts 612 may include various components configured to fulfill at least one function of the one or more services 610. The one or more hosts 612 may be configured to provide virtualized computing services such as compute instances. The one or more clients 650 may be external to the provider network 600 and thus are connected to the provider network 600 via a network 660. The network 660 may include one or more network connections including but not limited to local area networks, wide area networks, wireless local area networks, cellular networks, fiber optic networks, etc.

The one or more hosts 612 may include one or more applications 614 configured to be executed on or by the one or more hosts 612. The clients 650 may be configured to access the applications 614 via one or more connections to the one or more hosts 612. The applications 614 may interact with a memory manager 620 to read and/or write data to and from system memory 630. These interactions may be included as part of the application or operating system read/write operation 140 of FIG. 1. The memory manager 620 may correspond to the memory manager 120 of FIG. 1. The memory manager 620 may include a compression manager 622 configured to compress memory pages that qualify as candidates for compression based at least in part on the last time the memory pages were used by the applications 614 in an uncompressed region of the system memory 630. The uncompressed region may correspond to the uncompressed region 112 of FIG. 1. The memory manager 620 may be configured to transfer the compressed memory pages to a compressed region of the system memory 630. The compressed region may correspond to the compressed region 115 of FIG. 1. In some embodiments, the memory manager 620 may be configured to transfer memory pages to a data store 640. The data store 640 may be a component of the one or more hosts 612. In other embodiments, the data store 640 may be external to the one or more hosts 612.

Figure 7:
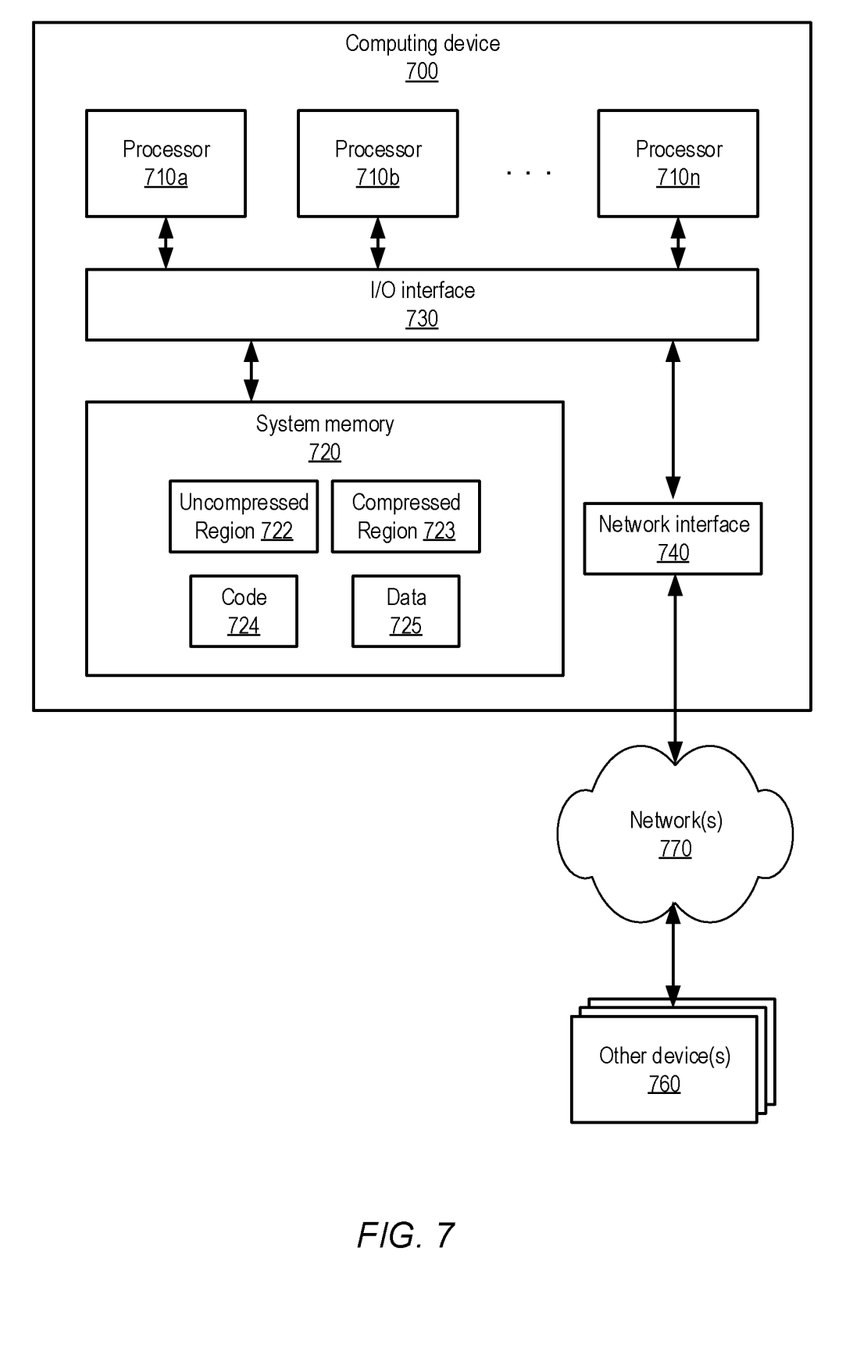
FIG. 7 is a block diagram illustrating an example computer system that may be used in some embodiments.

Any of various computer systems may be configured to implement techniques for managing memory compression in a secure manner, as disclosed herein. For example, FIG. 7 is a block diagram illustrating one embodiment of a computer system suitable for implementing some or all of the techniques and systems described herein. For example, each of the computer systems may host one or more respective containers. In some cases, a host computer system may host multiple containers. In various embodiments, the provider network may include one or more computer systems 700 such as that illustrated in FIG. 7 or one or more components of the computer system 700 that function in a same or similar way as described for the computer system 700.

In the illustrated embodiment, computer system 700 includes one or more processors 710 coupled to a system memory 720 via an input/output (I/O) interface 730. Computer system 700 further includes a network interface 740 coupled to I/O interface 730. In some embodiments, computer system 700 may be illustrative of servers implementing enterprise logic or downloadable application, while in other embodiments servers may include more, fewer, or different elements than computer system 700.

In various embodiments, computer system 700 may be a uniprocessor system including one processor 710, or a multiprocessor system including several processors 710 (e.g., two, four, eight, or another suitable number). Processors 710 may be any suitable processors capable of executing instructions. For example, in various embodiments, processors 710 may be embedded processors implementing any of a variety of instruction set architectures (ISAs), such as the x106, PowerPC, SPARC, or MIPS ISAs, or any other suitable ISA. In multiprocessor systems, each of processors 710 may commonly, but not necessarily, implement the same ISA.

System memory 720 may be configured to store instructions and data accessible by processor 710. In various embodiments, system memory 720 may be implemented using one or more of any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for the management of securely memory compression are shown stored within system memory 720 as program instructions 724. In some embodiments, system memory 720 may include data 725 which may be configured as described herein. In some embodiments, system memory 720 may include an uncompressed region 722 configured to store memory pages and a compressed region 723 configured to store compressed memory pages.

In one embodiment, I/O interface 730 may be configured to coordinate I/O traffic between processor 710, system memory 720 and any peripheral devices in the system, including through network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments, some or all of the functionality of I/O interface 730, such as an interface to system memory 720, may be incorporated directly into processor 710.

Network interface 740 may be configured to allow data to be exchanged between computer system 700 and other devices attached to a network, such as between client devices (e.g., 760, etc.) and other computer systems, or among hosts, for example. In particular, network interface 740 may be configured to allow communication between computer system 700 and/or various other devices 760 (e.g., I/O devices). Other devices 760 may include scanning devices, display devices, input devices and/or other communication devices, as described herein. Network interface 740 may commonly support one or more wireless networking protocols (e.g., Wi-Fi/IEEE 802.11, or another wireless networking standard). However, in various embodiments, network interface 740 may support communication via any suitable wired or wireless general data networks 770, such as other types of Ethernet networks, for example. Additionally, network interface 740 may support communication via telecommunications/telephony networks such as analog voice networks or digital fiber communications networks, via storage area networks such as Fibre Channel SANs, or via any other suitable type of network and/or protocol.

In some embodiments, system memory 720 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 700 via I/O interface 730. A computer-readable storage medium may also include any volatile or non-volatile media such as RAM (e.g. SDRAM, DDR SDRAM, RDRAM, SRAM, etc.), ROM, etc., that may be included in some embodiments of computer system 700 as system memory 720 or another type of memory. Further, a computer-accessible medium may include transmission media or signals such as electrical, electromagnetic, or digital signals, conveyed via a communication medium such as a network and/or a wireless link, which may be implemented via network interface 740.

In some embodiments, I/O devices may be relatively simple or "thin" client devices. For example, I/O devices may be configured as dumb terminals with display, data entry and communications capabilities, but otherwise little computational functionality. However, in some embodiments, I/O devices may be computer systems configured similarly to computer system 700, including one or more processors 710 and various other devices (though in some embodiments, a computer system 700 implementing an I/O device 750 may have somewhat different devices, or different classes of devices).

In various embodiments, I/O devices (e.g., scanners or display devices and other communication devices) may include, but are not limited to, one or more of: handheld devices, devices worn by or attached to a person, and devices integrated into or mounted on any mobile or fixed equipment, according to various embodiments. I/O devices may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 700. In general, an I/O device (e.g., cursor control device, keyboard, or display(s) may be any device that can communicate with elements of computing system 700.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on one or more computer-readable storage media coupled to the processor. The program instructions may be configured to implement the functionality described herein (e.g., the functionality of the data transfer tool, various services, databases, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
   a system memory comprising an uncompressed region and a compressed region; and
   a memory manager configured to:
      receive a request for a compressed memory page of a plurality of compressed memory pages in the compressed region of the system memory, wherein different pages of the plurality of compressed memory pages require different amounts of time to decompress;
      read the requested compressed memory page from the compressed region;
      start a decompression timer for a constant decompression time for the plurality of compressed memory pages, wherein the constant decompression time is based on an analysis of decompression times of a plurality of memory pages to be less than a worst-case decompression time for the plurality of memory pages;
      after starting the decompression timer, generate a decompressed memory page based on decompression of the entire requested compressed memory page, wherein generation of the decompressed memory page is completed prior to the decompression timer reaching the constant decompression time; and
      in response to the decompression timer reaching the constant decompression time, fulfill the request and write the decompressed memory page to the uncompressed region of the system memory.

2. The system of claim 1, wherein the memory manager is further configured to:
   receive the plurality of memory pages;
   estimate respective decompression times for each of the plurality of memory pages;
   determine statistics of a distribution of the decompression times for the plurality of memory pages; and
   select the constant decompression time based at least in part on the statistics.

3. The system of claim 2, wherein to determine the statistics of the distribution of the decompression times, the memory manager is further configured to:
   determine an average decompression time of the decompression times; and
   wherein to select the constant decompression time, the memory manager is further configured to:
      calculate the constant decompression time based at least in part on the average decompression time.

4. The system of claim 2, wherein to determine the statistics of the distribution of the decompression times, the memory manager is further configured to:
   determine the worst-case decompression time from the decompression times; and
   wherein to select the constant decompression time, the memory manager is further configured to:
      calculate the constant decompression time based at least in part on the worst-case decompression time.

5. The system of claim 1, wherein the memory manager is further configured to:
   after the decompressed memory page is generated and prior to the decompression timer reaching the constant decompression time, compress one or more other memory pages; and
   store the compressed one or more other memory pages to the compressed region of the system memory.

6. The system of claim 1, wherein the memory manager is further configured to:
   after the decompressed memory page is generated and prior to the decompression timer reaching the constant decompression time, decompress one or more other memory pages; and
   store the decompressed one or more other memory pages to the uncompressed region of the system memory.

7. The system of claim 1, wherein the memory manager is further configured to:
   after the request is fulfilled, free memory space in the compressed region of the system memory corresponding to the compressed memory page.

8. A method, comprising:
   receiving a request for a compressed memory page of a plurality of compressed memory pages in a compressed region of a system memory, wherein different pages of the plurality of compressed memory pages require different amounts of time to decompress;
   reading the compressed memory page from the compressed region;
   starting a decompression timer for a constant decompression time for the plurality of compressed memory pages, wherein the constant decompression time is based on an analysis of decompression times of a plurality of memory pages to be less than a worst-case decompression time for the plurality of memory pages;
   after starting the decompression timer and before the constant decompression time elapses, generating a decompressed memory page based on decompressing the entire requested compressed memory page, wherein generating the decompressed memory page is completed prior to the decompression timer reaching the constant decompression time; and
   in response to the decompression timer reaching the constant decompression time, fulfilling the request and write the decompressed memory page to an uncompressed region of the system memory.

9. The method of claim 8, further comprising:
   receiving the plurality of memory pages;
   estimating respective decompression times for each of the plurality of memory pages;
   determining statistics of a distribution of the decompression times for the plurality of memory pages; and
   selecting the constant decompression time based at least in part on the statistics.

10. The method of claim 9, wherein determining the statistics of the distribution of the decompression times comprises:
    determining an average decompression time of the decompression times; and
    wherein selecting the constant decompression time comprises:
       calculating the constant decompression time based at least in part on the average decompression time.

11. The method of claim 9, wherein determining the statistics of the distribution of the decompression times comprises:
    determining the worst-case decompression time from the decompression times; and
    wherein selecting the constant decompression time comprises:
       calculating the constant decompression time based at least in part on the worst-case decompression time.

12. The method of claim 8, further comprising:

after generating the decompressed memory page and prior to the decompression timer reaches the constant decompression time, compressing one or more other memory pages; and storing the compressed one or more other memory pages to the compressed region of the system memory.

13. The method of claim 8, further comprising:

after generating the decompressed memory page and prior to the decompression timer reaches the constant decompression time, decompressing one or more other memory pages; and storing the decompressed one or more other memory pages to the uncompressed region of the system memory.

14. The method of claim 8, further comprising:

after the request is fulfilled, freeing memory space in the compressed region of the system memory corresponding to the compressed memory page.

15. One or more non-transitory, computer-readable storage media storing instructions that, when executed on or across one or more processors, cause the one or more processors to:

in response a request for a compressed memory page of a plurality of compressed memory pages in a compressed region of a system memory, read the compressed memory page from the compressed region, wherein different pages of the plurality of compressed memory pages require different amounts of time to decompress;

start a decompression timer for a constant decompression time for the plurality of compressed memory pages, wherein the constant decompression time is based on an analysis of decompression times of a plurality of memory pages to be less than a worst-case decompression time for the plurality of memory pages;

after starting the decompression timer, generate a decompressed memory page based on decompression of the entire requested compressed memory page, wherein generation of the decompressed memory page is completed prior to the decompression timer reaching the constant decompression time; and in response to the decompression timer reaching the constant decompression time, fulfill the request and write the decompressed memory page to an uncompressed portion of the system memory.

16. The one or more non-transitory, computer-readable storage media of claim 15, further comprising instructions that cause the one or more processors to:

estimate respective decompression times for each of the plurality of memory pages;

determine statistics of a distribution of the decompression times for the plurality of memory pages; and select the constant decompression time based at least in part on the statistics.

17. The one or more non-transitory, computer-readable storage media of claim 16, further comprising instructions that cause the one or more processors to:

determine an average decompression time of the decompression times; and calculate the constant decompression time based at least in part on the average decompression time.

18. The one or more non-transitory, computer-readable storage media of claim 16, further comprising instructions that cause the one or more processors to:

determine the worst-case decompression time from the decompression times; and calculate the constant decompression time based at least in part on the worst-case decompression time.

19. The one or more non-transitory, computer-readable storage media of claim 15, further comprising instructions that cause the one or more processors to:

after the decompressed memory page is generated and prior to the decompression timer reaching the constant decompression time, perform one or more additional functions separate from decompression of the compressed memory page.

20. The one or more non-transitory, computer-readable storage media of claim 15, further comprising instructions that cause the one or more processors to:

after the request is fulfilled, free memory space in the compressed region of the system memory corresponding to the compressed memory page.

* * * * *